United States Patent [19]

Iino

[11] Patent Number: 4,967,191
[45] Date of Patent: Oct. 30, 1990

[54] DISPLAY APPARATUS FOR AUTOMOTIVE VEHICLE

[75] Inventor: Tadashi Iino, Susono, Japan

[73] Assignee: Yazaki Corporation, Japan

[21] Appl. No.: 383,041

[22] Filed: Jul. 21, 1989

Related U.S. Application Data

[63] Continuation of Ser. No. 182,193, Apr. 15, 1988, abandoned.

[30] Foreign Application Priority Data

Apr. 16, 1987 [JP] Japan .................................. 62-56666
Apr. 23, 1987 [JP] Japan .................................. 62-60664

[51] Int. Cl.$^5$ .............................................. G09G 3/02
[52] U.S. Cl. .................................... 340/705; 340/980; 350/174; 353/14
[58] Field of Search ................... 340/705, 98, 97, 980; 353/13, 14; 358/103, 104, 93, 250; 350/174

[56] References Cited

U.S. PATENT DOCUMENTS

| | | | |
|---|---|---|---|
| 3,663,112 | 5/1972 | Jones et al. | 350/174 |
| 3,945,716 | 3/1976 | Kinder | 350/174 |
| 3,950,072 | 4/1976 | Aten | 353/14 |
| 4,600,271 | 7/1986 | Boyer et al. | 358/250 |
| 4,632,508 | 12/1986 | Connelly | 340/705 |
| 4,652,870 | 3/1987 | Steward | 340/705 |
| 4,711,544 | 12/1987 | Iino et al. | 353/14 |
| 4,717,248 | 1/1988 | LaRussa | 340/705 |
| 4,742,389 | 5/1988 | Schiffman | 358/250 |
| 4,787,711 | 11/1988 | Suzuki . | |
| 4,804,836 | 2/1989 | Iino | 340/705 |
| 4,831,366 | 5/1989 | Iino | 340/705 |
| 4,837,551 | 6/1989 | Iino | 340/705 |
| 4,886,328 | 12/1989 | Iino . | |
| 4,908,611 | 3/1990 | Iino . | |

FOREIGN PATENT DOCUMENTS 2123974  2/1984  United Kingdom ................ 340/705

Primary Examiner—Alvin E. Oberley
Assistant Examiner—M. Fatahiyar
Attorney, Agent, or Firm—Wigman & Cohen

[57] ABSTRACT

A display apparatus for an automotive vehicle comprises a projector disposed at the ceiling of a vehicle passenger compartment to project display images and a reflecting member pivotally disposed in a dashboard of the vehicle to reflect the display images projected by the projector toward the driver. The reflecting member is a mirror or a hologram plate. The display images are stable without being subjected to the influence of external sunlight, while increasing the field of vision on the front windshield. Further, when the hologram plate is used, it is possible to obtain large display images in spite of a small-sized projector and to improve the visual recognizability of display images.

2 Claims, 5 Drawing Sheets

DISPLAY APPARATUS FOR AUTOMOTIVE VEHICLE

This is a continuation of co-pending application Ser. No. 07/182,193 filed on Apr 15, 1988 now abandoned.

BACKGROUND OF THE INVENTION

1. Field of the Invention

The present invention relates generally to a display apparatus for an automotive vehicle and more specifically to a display apparatus for displaying vehicle-related information to a driver as virtual images by means of a projector and a reflector.

2. Description of the Prior Art

With increasing diversification of display units mounted in automotive vehicles, apparatuses including a projector have recently been proposed as novel display apparatuses for automotive vehicles. FIG. 1(A) shows an example of such a prior-art display apparatus. In the drawing, a projector 4 including a display unit 2 and a lens 3 is arranged within a dashboard 1 so that the optical axis thereof is directed in the upward direction. Further, a half mirror 6 is mounted on the dashboard 1 inside a front windshield 5 with an inclination angle θ with respect to a transparent plate (e.g. glass) 1a placed on the dashboard 1.

In the display apparatus shown in FIG. 1(A), a display image from the display unit 2 is projected upon the half mirror 6 through the transparent plate 1a and then reflected by the reflector 6 toward driver 7. Therefore, the driver 7 can see the display images from the display unit 2 as a virtual image 8 outside the front windshield 5, while looking through the front windshield 5 to the outside.

In the above-mentioned prior-art display apparatus, since a half mirror is used, the light availability and image recognizability are not satisfactory.

Further, since the projector 4 is housed in the dashboard 1 together with various instruments, it is very difficult to appropriately arrange the projector 4 within the dashboard 1, and the size and position of the half mirror 6 are restricted in relation to the projector position. Moreover, when the display comprises a liquid crystal display and a light source, it is not easy to effectively radiate heat generated from the light source toward the outside of the dashboard 1.

In addition, in the case where intense sunlight is allowed to be incident upon the transparent plate 1a through the half mirror 6, and then reflected from the half mirror 6 toward the driver 7, as shown in FIG. 1(B), the driver 7 will be unable to clearly recognize the display images of the projector 4.

Furthermore, there exists another problem in that it is difficult to clean the inner surface of the front windshield 5 because the half mirror 6 is mounted on the dashboard 1.

FIG. 2 shows another example of a prior-art display apparatus including a projector. In this example, a projector 13 including a display unit 13a (e.g. liquid crystal display, electron-ray indicator tubes, etc.) is disposed under the meter hood 12 of an instrument panel 11; and a half mirror 14 with a high reflectivity (e.g. acrylic resin or glass whose surface is coated with a metallic film deposition is disposed at an indicator display position within the instrument panel 11, in order to reflect display images 13b projected from the display unit 13a toward the driver 7.

Unfortunately, in this prior-art display apparatus, since the projector 13 is disposed near the half mirror 14, the virtual images are displayed in a relatively short distance corresponding to that between the projector 13 and the half mirror 14, so that the visual recognizability of display image is relatively poor.

SUMMARY OF THE INVENTION

With these problems in mind, therefore, it is the primary object of the present invention to provide a display apparatus for an automotive vehicle which can increase the field of vision through the front windshield, facilitate cleaning of the inner surface of the front windshield, and improve visual display recognizability without being subjected to the influence of external sunlight.

To achieve the above-mentioned object, the display apparatus for an automotive vehicle according to the present invention comprises: (a) projecting means, disposed in a passenger compartment of the automotive vehicle, for projecting display images; and (b) reflecting means, disposed in a dashboard of the automotive vehicle, for reflecting the display images projected by said projecting means toward a driver of the automotive vehicle.

The reflecting means is a mirror or a hologram plate. Further, when the projecting means is disposed on the ceiling of the passenger compartment, it is preferable to dispose another reflecting means on the ceiling of the passenger compartment to reflect display images projected by the projecting means toward the reflecting means.

BRIEF DESCRIPTION OF THE DRAWINGS

The features and advantages of the display apparatus according to the present invention will be more clearly appreciated from the following description taken in conjunction with the accompanying drawings.

DETAILED DESCRIPTION OF THE PREFERRED EMBODIMENTS

An embodiment of the display apparatus of the present invention will be described hereinbelow with reference to the attached drawings.

Figure 1A:
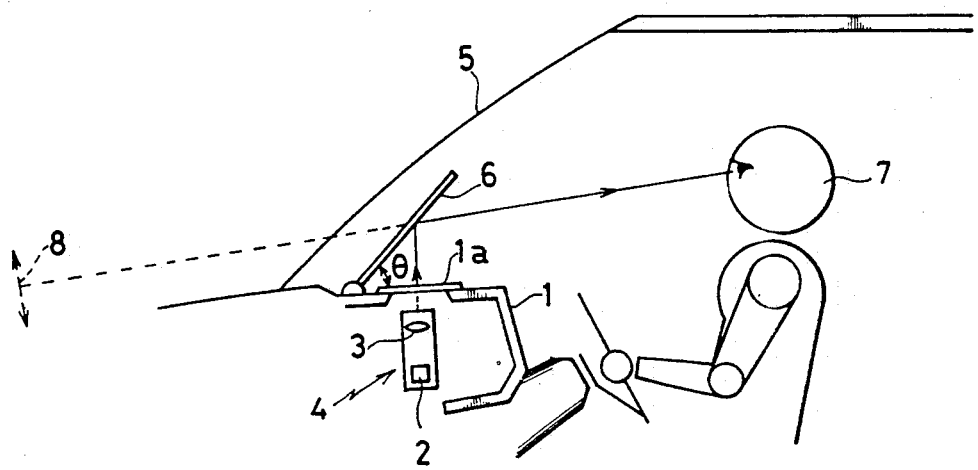
FIG. 1(A) is a diagrammatical illustration showing a prior-art display apparatus for an automotive vehicle.
Figure 1A:
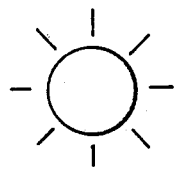
Figure 1B:
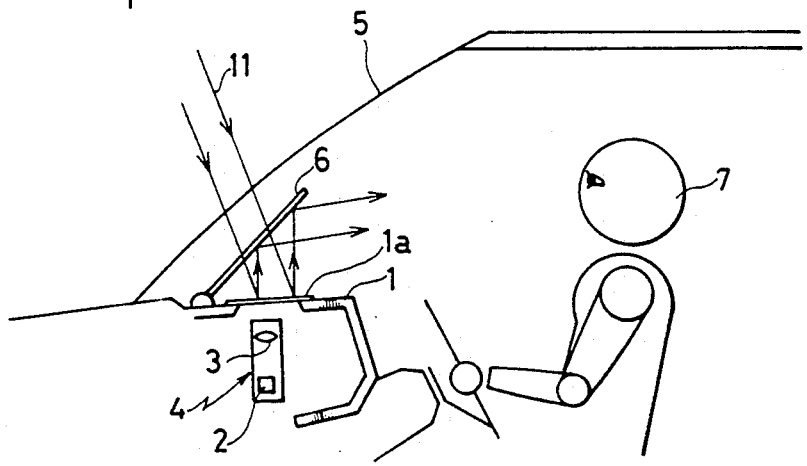
FIG. 1(B) is a similar diagrammatical illustration for assistance in explaining a problem involved in the prior-art apparatus.
Figure 2:
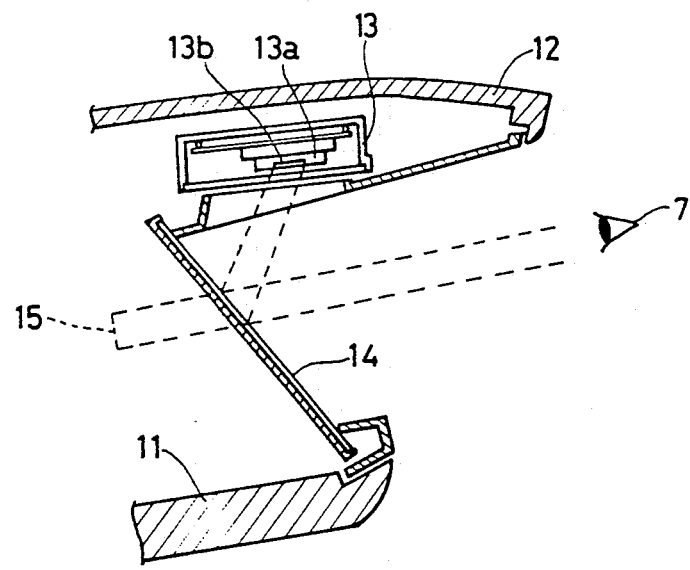
FIG. 2 is an enlarged cross-sectional view showing another prior-art display apparatus for an automotive vehicle.
Figure 3A:
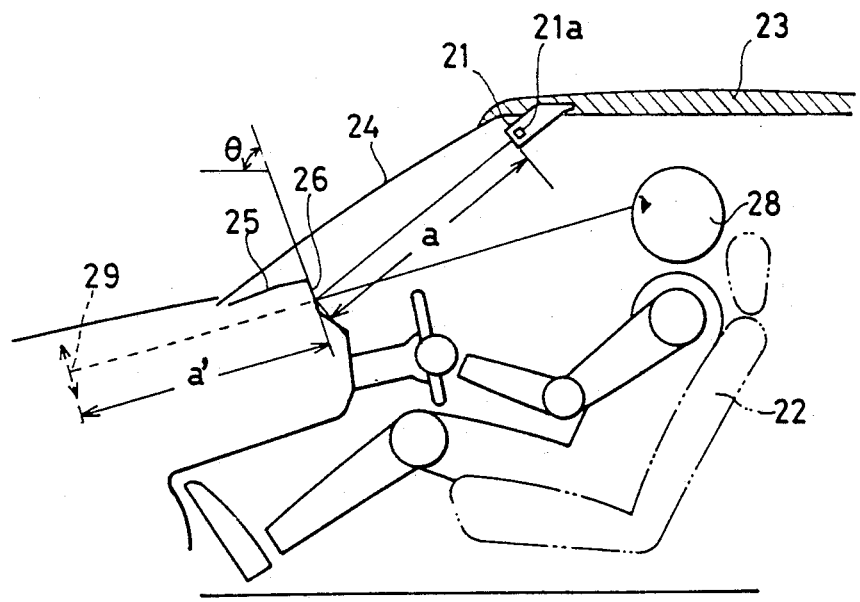
FIG. 3(A) is a diagrammatical illustration showing a first embodiment of the display apparatus for an automotive vehicle according to the present invention.
Figure 3B:
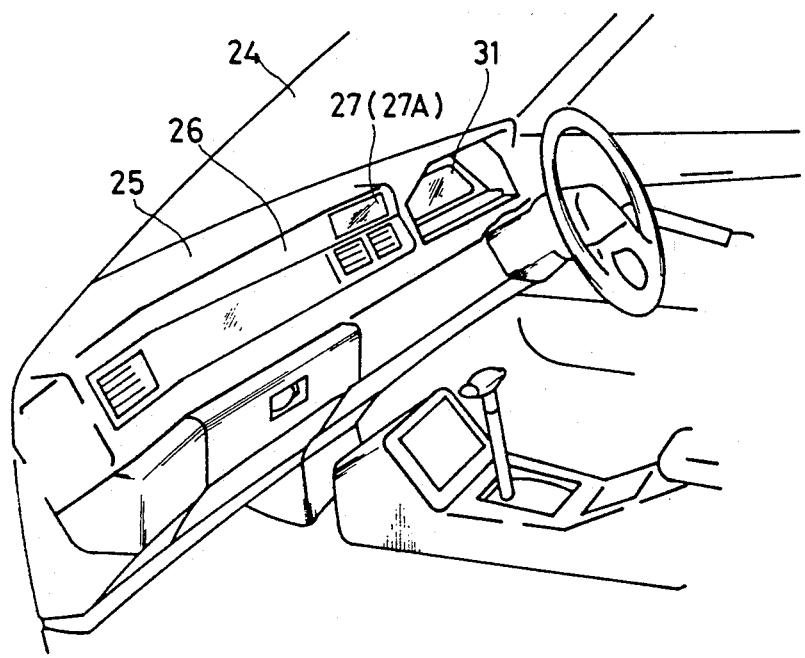
FIG. 3(B) is a perspective view showing a dashboard in which a reflector of the present invention is disposed.

FIGS. 3(A), (B) and (C) show a first embodiment, in which the display apparatus comprises a projector 21 including a display unit 21a and a pivotal reflector mirror 27 (shown in FIG. 3B). The projector 21 is fixed, for instance, at a ceiling 23 over a driver's seat 22 within a passenger compartment of a vehicle. The display unit 21a consists of one of the following: a liquid crystal panel, a cathode ray tube, electron-ray indicator tubes, an electro luminescence device, a plasma display panel, or any such similar device. The reflector mirror 27 serving as a projection plane is provided on a panel surface 26 of a dashboard 25 in front of the driver's seat 22 and in back of a front windshield 24. This mirror 27 is inclined toward the front windshield 24 upside frontward.

The display unit 21a disposed within the projector 21 displays various vehicle-related information such as vehicle speed, engine speed, etc. The display image is projected onto the reflector mirror 27 and then reflected from the reflector mirror 27 to the eyes of a driver 28. In this case, the driver 28 can see a virtual image 29 at a distance a' behind the reflector mirror 27. This distance a' is equal to the distance a between the display unit 21a and the reflector mirror 27. This distance a or a' is approximately 50 to 60 cm.

FIG. 3(B) shows an example of location at which the reflector mirror 27 is arranged on the panel surface 26 of the dashboard 25. Further, in FIG. 3(B), the numeral 31 denotes an instrument panel.

In the above first embodiment, the reflector mirror 27 is disposed independently in the panel surface 26 of the dashboard 25. However, it is also possible to dispose a half mirror at the instrument panel 31.

Figure 3C:
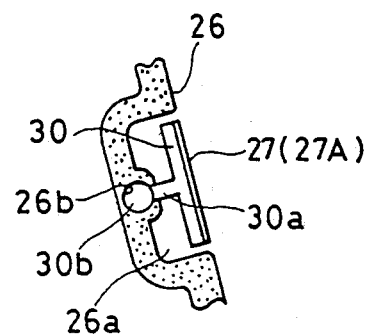
FIG. 3(C) is an enlarged side view showing a pivotable mirror of the present invention disposed within a recessed portion of the dashboard.

FIG. 3(C) shows an example of structure of a pivotal reflector mirror 27. This mirror 27 is formed with a support rod 30a at the center of the back surface of the mirror 27. A ball 30b is formed at the end of the support rod 30a. On the other hand, a recessed portion 26a is formed on the panel surface 26 of the dashboard 25 to accommodate the reflector mirror 27. A ball-shaped recess 26b is formed at the bottom of the panel surface 26 in such a way that the ball 30b of the support rod 30a can pivotally be supported within the recess 26b, and further the reflector surface of the accommodated reflector mirror 27 is roughly flush with the panel surface 26. Therefore, when specific areas along the periphery of the reflector mirror 27 are pushed inward, the reflector mirror 27 is pivoted to a predetermined reflection angle at which the driver 28 can clearly see display images on the reflector mirror 27. Further, when required, it is also possible to pivot the reflector mirror 27 to a position at which an assistant driver or another passenger taking a rear seat can see display images on the reflector mirror 27.

In the above description, display images projected from the projector 21 are reflected toward the driver 28 via the reflector mirror 27. Without being limited to the mirror 27, however, it is also possible to use a hologram plate 27A in place of the mirror 27 as a second embodiment.

This hologram plate 27A can reflect only light of a single wavelength at a high reflectivity.

This hologram plate is a holographic dryplate on which a hologram is recorded. The holographic dryplate is obtained by applying a hologram emulsion such as ammonium dichromate gelatin photosensitive material onto a surface of a transparent substrate such as glass. The position of the virtual image 29 of the display unit 21 is determined by the position of the light source when the hologram is being formed. However, the inclination angle $\theta$ of the hologram plate 27A can be determined freely irrespective of the positional relationship with respect to the light source required for forming the hologram.

Figure 4:
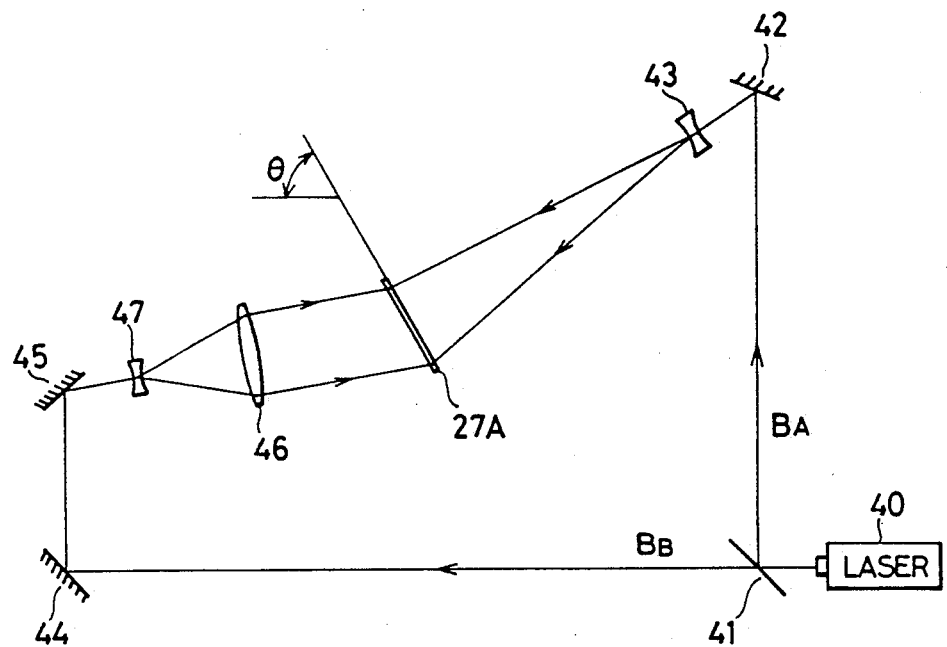
FIG. 4 is an illustration for assistance in explaining a method of manufacturing a hologram plate used for the second embodiment of the display apparatus according to the present invention.

With reference to FIG. 4, the method of manufacturing a virtual display image at an infinite point from the driver 28 will be described hereinbelow by way of example.

The hologram plate 27A is fixed at an inclination angle $\theta$ the same as the mounting angle on the dashboard 25. A laser beam generated from a laser generator 40 is split into two direcitons via a beam splitter 41. A first split beam $B_A$ is reflected by a mirror 42 and then diffused by a concave lense 43, disposed at a position corresponding to that at which the display unit 21 is mounted (at the ceiling of the passenger compartment), toward the hologram recording surface 27A. Respectively, a second split beam $B_B$ is reflected twice by two mirrors 44 and 45 and then diffused by a concave lens 47, disposed at the focal position of a convex lens 46, toward the convex lens 46 in such a way that the light passing through the lens 46 is collimated toward the hologram recording surface 27A. In this case, the direction of the parallel light corresponds to the line of sight of the driver. As described above, when the light beam $B_A$ propagating with spherical wave fronts, and the light beam $B_B$, propagating with plane wave fronts, are applied respectively to the front and back sides of the hologram recording surface, it is possible to obtain a Lippman type hologram plate on which interference fringes are formed in the thickness direction of the hologram emulsion layer. When a display image of the display unit 21 is projected upon the hologram plate 27A in the same direction as was the recording light beam, only light with a wavelength which satisfies the Bragg reflection condition is reflected from the hologram plate 27A, so that the virtual display image 29 can be seen at an infinite point from the hologram plate 27A or the driver 28.

Further, the wavelength selectivity of the hologram plate is determined by the wavelength of the recording laser beam and intervals between interference fringes of the emulsion layer. In the case of a Lippman hologram plate using ammonium dichromate gelatin, about 80% of the light beam having a specific wavelength is reflected therefrom and about 90% of the light beam having other wavelengthes is transmitted therethrough. Therefore, it is possible to see a clearly reflected display image on the hologram plate 27A.

Figure 5:
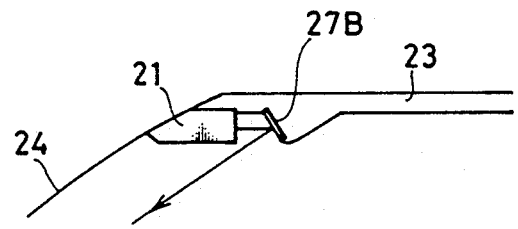
FIG. 5(B) is a similar diagrammatical illustration showing a modification of the second embodiment of the apparatus according to the present invention.

FIG. 5 shows a modification of the second embodiment of the display apparatus. In FIG. 5, a light beam transmitted from the projector 21 fixed at the ceiling is reflected from a second hologram plate 27B, also fixed to the ceiling, before being guided upon the hologram plate 27A arranged in the dashboard 25. In this modification, it is possible to fix the projector 21 on the ceiling at a frontward position from the driver. Further, when the first and second hologram plates 27A and 27B are formed in such a way that the geometrical structure and the grating characteristics become equivalent to each other, it is possible to obtain a clearer display image free from optical aberration along the line of sight of the driver, because the optical dispersions can cancel each other.

In this second embodiment, since the hologram plate is provided with the same optical function as a lens, it is unnecessary to arrange a lens within the projector, and therefore the projector size can be minimized. Further, in the ordinary projector, it is necessary to increase the diameter of the lens or to decrease the distance between the lens and the driver's eye in order to increase the field of vision. In the case of the hologram plate, it is possible to easily obtain a large field of vision on the basis of the method of recording display images on the hologram plate. Furthermore, since the hologram has a selectivity with respect to wavelength of light, it is possible to improve the visual recognizability of display images by defining the wavelength of the light beam projected upon the hologram plate within a specific range.

As described above, in the display apparatus for an automotive vehicle according to the present invention, since the projector unit is fixed to the ceiling of the passenger compartment, and the reflecting member such as mirror, hologram plate, etc. is disposed on the dashboard panel, it is possible to increase the field of vision through the front windshield, to facilitate cleaning of the inner surface of the front windshield, and to prevent sunlight from being reflected from the reflector member toward the driver, thus improving visual display recognizability.

Further, where the hologram plate is used as the reflecting member, since virtual display images can be formed far in the distance from the reflecting member, it is possible to reduce the variation of the driver's visual focal points, thus decreasing fatigue of the eyes (eyestrain) and increasing visual recognizability of display images.

What is claimed is:
1. A display apparatus for an automotive vehicle, which comprises:
    (a) a projector, disposed at a ceiling in a passenger compartment of the automotive vehicle, for projecting display images;
    (b) a reflector, disposed in a recess formed in a panel surface of a dashboard of the automotive vehicle, for reflecting the display images projected by said projecting means toward a driver of the automotive vehicle, said reflector being any one of a mirror and a hologram plate being disposed frontwardly inclined so that an upper portion of said reflector is positioned relatively closer to a front end of said vehicle than is a lower portion of said reflector; and
    (c) a pivotal shaft, disposed in the recess formed in the panel surface of the dashboard, for pivoting said reflector.
2. The display apparatus for an automotive vehicle as set forth in claim 1, which further comprises another reflector, disposed at the ceiling in the passenger compartment, for reflecting the display images projected by said projector disposed at the ceiling toward said other reflector disposed in the recess formed in the panel surface of a dashboard, said other reflector being any one of a mirror and a hologram plate.

* * * * *